United States Patent
Bullinger et al.

(10) Patent No.: US 6,833,791 B2
(45) Date of Patent: Dec. 21, 2004

(54) METHOD FOR SENSING THE READINESS OF A DRIVER TO BRAKE

(75) Inventors: Wilfried Bullinger, Korntal-Muenchingen (DE); Florent Paviot, Filderstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/260,338

(22) Filed: Oct. 1, 2002

(65) Prior Publication Data

US 2003/0085810 A1 May 8, 2003

(30) Foreign Application Priority Data

Oct. 1, 2001 (DE) .......................................... 101 48 534

(51) Int. Cl.$^7$ .............................................. G08B 23/00

(52) U.S. Cl. ...................................... 340/576; 439/479

(58) Field of Search .............................. 340/576, 573.1, 340/573.7, 439, 467, 479, 665; 180/272, 273; 280/735; 303/191

(56) References Cited

U.S. PATENT DOCUMENTS

| | | | | |
|---|---|---|---|---|
| 5,115,162 A | * | 5/1992 | Leonard et al. | 310/339 |
| 5,835,008 A | * | 11/1998 | Colemere, Jr. | 340/439 |
| 5,921,641 A | * | 7/1999 | Lupges et al. | 303/191 |
| 6,002,329 A | * | 12/1999 | Marks | 340/467 |
| 6,023,227 A | * | 2/2000 | Yanko et al. | 340/576 |
| 6,293,361 B1 | * | 9/2001 | Mueller | 180/272 |
| 6,323,487 B1 | * | 11/2001 | Wu | 250/341.1 |
| 6,474,753 B1 | * | 11/2002 | Rieth et al. | 303/191 |
| 2002/0105423 A1 | * | 8/2002 | Rast | 340/479 |

* cited by examiner

Primary Examiner—Jeffery Hofsass
Assistant Examiner—Anne V. Lai
(74) Attorney, Agent, or Firm—Crowell & Moring LLP

(57) ABSTRACT

A method senses the readiness of a driver of a motor vehicle to brake. The position of the feet of the driver are sensed by a sensor arrangement at the foot well of the motor vehicle in order to determine the position of the right-hand foot and the left-hand foot of the driver and/or the leg posture of the driver. In order to sense the feet and/or leg posture of the driver, a pressure-sensitive film with a matrix of pressure-sensitive cells may be arranged in the foot well of the motor vehicle. An expected time which the driver takes to activate the brake in a hazardous situation can be derived from the position of the feet at a particular time.

13 Claims, 1 Drawing Sheet

METHOD FOR SENSING THE READINESS OF A DRIVER TO BRAKE

This application claims the priority of German Patent Application No. 101 48 534.4, filed Oct. 1, 2001, the disclosure of which is expressly incorporated by reference herein.

BACKGROUND OF THE INVENTION

The present invention relates to a method for sensing the readiness of a driver to brake, in order to be able to generate adaptive warning times.

In known driver assistance systems, for example cruise controller with distance control, cornering warning or automatic driver lane detection or guiding, there are often critical situations in which the driver is warned or must very quickly assume control of the vehicle again and possibly brake quickly.

In known systems this is usually carried out by an audible warning signal. The prewarning time or the warning intensity is usually a constant parameter and is not adapted to the driver's degree of attentiveness or readiness to act. This has the disadvantage that in many situations the warning comes too late or in many situations too early, which the driver experiences as an attempt to relieve him of control.

SUMMARY OF THE INVENTION

An object of the present invention is to specify a method for determining the readiness of the driver of a motor vehicle to brake. This method is also to make it possible to adapt the warnings, generated by a vehicle-mounted driver assistance system in the vehicle, to the readiness of the driver to brake.

This object is achieved according to the invention by the readiness of a motor vehicle driver to brake is determined by the position of the driver's feet which is sensed by a sensor arrangement which senses the foot well of the motor vehicle to determine the position of the right-hand foot and left-hand foot of the driver and/or the leg posture of the driver.

In order to sense the feet and/or leg posture of the driver, a pressure-sensitive film with a matrix of pressure-sensitive cells can be arranged in the foot well of the motor vehicle. This film can easily be integrated into the foot mat.

Alternatively, photoelectric barriers can be arranged one next to the other so as to be interrupted by the driver's feet in accordance with their position for sensing the feet and/or leg posture of the driver.

It is also contemplated to arrange infrared sensors in the foot well of the motor vehicle. The infrared sensors generate signals which sense the feet and/or leg posture of the driver by the triangulation method.

In accordance with a further development, an expected time t1 which the driver takes to activate the brake in a hazardous situation can be derived from the instantaneous position of the feet. The assessment as to whether a hazardous situation is present is performed by the vehicle-mounted driver assistance system. The prewarning time t2 of the vehicle-mounted driver assistance system can easily be adapted in accordance with the expected time t1.

The position of the driver's feet and/or legs at a particular time can be evaluated, and a signal or coefficient which represents the readiness of the driver at a particular time to carry out a necessary activation of the brake pedal can be generated.

According to one particularly advantageous currently contemplated refinement, this signal or coefficient can be used in an evaluation unit to generate, for example, an acoustic, optical, haptic or similar warning to the driver as a function of the travel situation at a particular time, or of the events on the road detected around the vehicle.

The timing of the generation of the warning can be dependent on the readiness of the driver at a particular time to execute a necessary activation of the brake pedal. Alternatively, or additionally, the warning can be generated as a function of the driver type, which is derived as a further signal variable or coefficient by a relatively long measurement and chronological statistical evaluation or formation of mean values.

Finally, the aforementioned signal or the coefficient can be used to actuate vehicle-mounted vehicle occupant protection and/or driver assistance systems which prevent or reduce an accident. Such systems are equipped with sensors which sense the surroundings, for example video cameras, radar etc. and/or actuators for influencing the lateral movement and/or longitudinal movement for a steering or braking intervention.

BRIEF DESCRIPTION OF THE DRAWING

These and other objects, features and advantages of the present invention will become more readily apparent from the following detailed description of currently preferred configurations thereof when taken in conjunction with the accompanying drawings wherein.

DETAILED DESCRIPTION OF THE DRAWING

Figure 1:
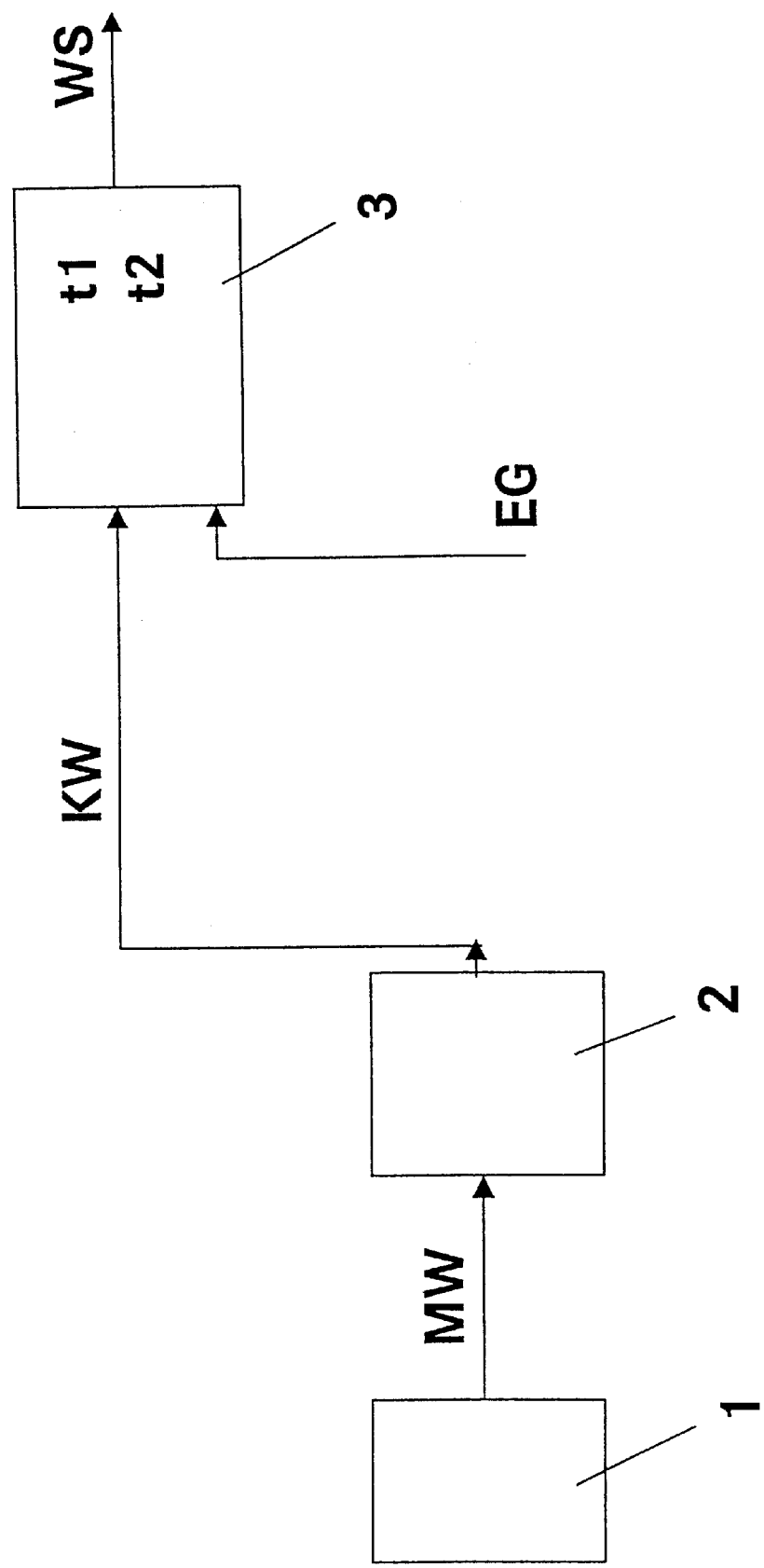
FIG. 1 is a schematic diagram showing how the method of operation according to the invention is implemented.

A sensor device 1, arranged in a conventional foot well (not shown) of a motor vehicle, generates a measured value MW which represents the position of the feet and/or legs of the driver. A coefficient for the warning time KW which is output to a driver warning system 3 is generated in an evaluation unit 2. The driver warning system 3 outputs a warning signal WS with an adaptive warning time to the driver.

The motor vehicle (not shown) can be equipped with a known driver assistance system, for example cruise controller with distance control, cornering warning or automatic lane detection or guiding. Such systems are equipped with sensors which sense the surroundings, for example video cameras, radar etc. and/or actuators for influencing the lateral and/or longitudinal movement for a steering or braking intervention, i.e., an intervention into the drive train.

The present invention provides for the position of the driver's feet to be sensed by one or more sensors 1 which are located in the foot well of the vehicle. In order to sense the driver's feet, according to a first embodiment a pressure-sensitive film is used which can be integrated, for example, in the foot mat. The film has a matrix of pressure-sensitive cells such as is the prior art, for example, in seat-occupation detection and vehicle-occupant classification apparatus. The matrix has a grid of preferably approximately 2 cm, i.e., has a number of preferably approximately 20×30 elements.

According to a further embodiment, the sensing can be carried out by a plurality of photoelectric barriers which are arranged one next to the other and which are interrupted by the driver's feet in accordance with their position. Furthermore, a generally known triangulation method with infrared sensors can be used.

The position of the right-hand foot and left-hand foot of the driver can be evaluated using the sensors, i.e., by way of a sensor matrix, photoelectric barriers, infrared sensors or the like. In this way it is known whether the foot is, for example, already directly located in front of the brake pedal or the accelerator pedal. In addition, it is thus known whether the driver has, for example, bent his legs and thus requires a significantly longer time to activate the brake.

An expected time t1 which the driver takes to activate the brake in a hazardous situation can then be derived from the position of the feet at a particular time. The prewarning time t2 of the driver assistance system can then be configured in accordance with the time t1. If t1 is short, t2 can also be selected to be short, if t1 is long, t2 can be selected to be correspondingly longer.

The present invention makes it possible to adapt the outputting of a warning in a way which is optimal in terms of time to the readiness to brake at a particular time, i.e., the time which the driver takes to activate the brake pedal.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

We claim:

1. A method for sensing the readiness of a driver of a motor vehicle to brake, comprising sensing a position of a driver's feet with a sensor arrangement which senses a motor vehicle foot well to determine at least one of a right foot position and a left foot position of the driver, and a leg posture of the driver, and deriving an expected time which the driver takes to activate the brake in a hazardous situation from the driver's feet position at a particular time.

2. The method according to claim 1, wherein the sensor arrangement comprises a pressure-sensitive film with a pressure-sensitive cell matrix arranged in the foot well to sense at least one of the feet position and leg the posture.

3. The method according to claim 1, wherein the sensor arrangement comprises photoelectric barriers arranged one next to the other so as to be interruptible by the driver's feet in accordance with their position.

4. The method according to claim 3, wherein the sensor arrangement comprises a pressure-sensitive film with a pressure-sensitive cell matrix arranged in the foot well to sense at least one of the feet position and leg the posture.

5. The method according to claim 1, wherein the sensor arrangement comprises infrared sensors configured to generate signals which sense at least one of the feet and leg posture by triangulation method and arranged in the foot well.

6. The method according to claim 5, wherein the sensor arrangement comprises a pressure-sensitive film with a pressure-sensitive cell matrix arranged in the foot well to sense at least one of the feet position and leg the posture.

7. The method according to claim 6, wherein the sensor arrangement comprises photoelectric barriers arranged one next to the other so as to be interruptible by the driver's feet in accordance with their position.

8. The method according to claim 1, further comprising adapting a prewarning time of a driver assistance system in the vehicle in accordance with the expected time.

9. The method according to claim 1, further comprising evaluating at least one of the feet position and the leg position at a particular time, and generating a signal or coefficient which represents the driver's readiness at a particular time to carry out a necessary activation of the brake pedal.

10. The method according to claim 9, further comprising employing the signal or coefficient in an evaluation unit to generate a warning including an acoustic warning, an optical warning, and a haptic warning to the driver as a function of the travel situation at a particular time, or of the events on the road detected around the vehicle.

11. The method according to claim 10, wherein the generation of the warning is timed to be dependent on the driver's readiness at a particular time to carry out a necessary brake pedal activation.

12. The method according to claim 1, further comprising generating the warning as a function of driver type derived as a further signal variable or coefficient via a relatively long measurement and chronological statistical evaluation or formation of average values.

13. The method according to claim 1, further comprising employing a signal or coefficient to actuate at least one vehicle occupant protection system and driver assistance system in the vehicle to prevent or reduce an accident.

* * * * *